G. R. NETTLETON.
BUCKLE.
APPLICATION FILED NOV. 2, 1915.

1,192,552.

Patented July 25, 1916.

Inventor
George R Nettleton
by Seymour & Earle
Atty

UNITED STATES PATENT OFFICE.

GEORGE R. NETTLETON, OF NEW HAVEN, CONNECTICUT, ASSIGNOR TO THE W. & E. T. FITCH CO., OF NEW HAVEN, CONNECTICUT, A CORPORATION.

BUCKLE.

1,192,552.  Specification of Letters Patent.  Patented July 25, 1916.

Application filed November 2, 1915. Serial No. 59,314.

*To all whom it may concern:*

Be it known that I, GEORGE R. NETTLETON, a citizen of the United States, residing at New Haven, in the county of New Haven and State of Connecticut, have invented a new and useful Improvement in Buckles; and I do hereby declare the following, when taken in connection with the accompanying drawings and the characters of reference marked thereon, to be a full, clear, and exact description of the same, and which said drawings constitute part of this application, and represent, in—

Figure 1:
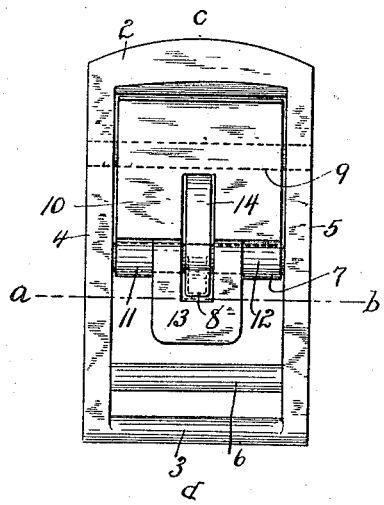
Figure 2:
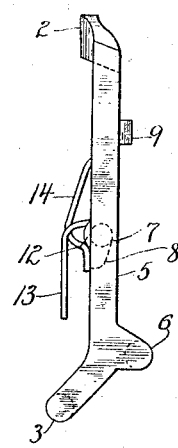
Figure 7:
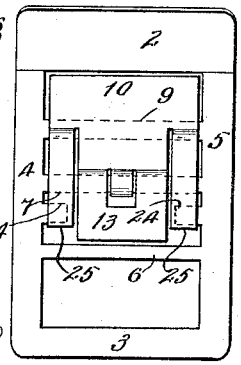
Figure 3:
Figure 4:
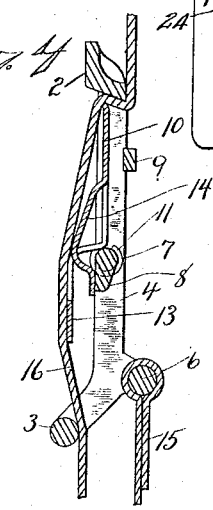
Figure 5:
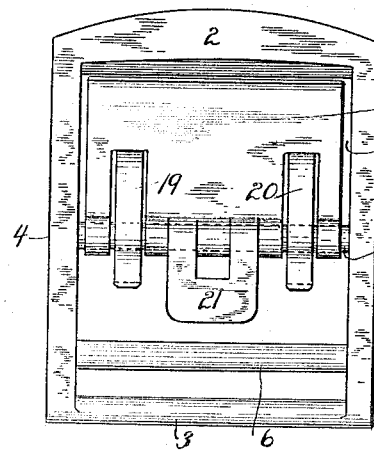
Figure 6:
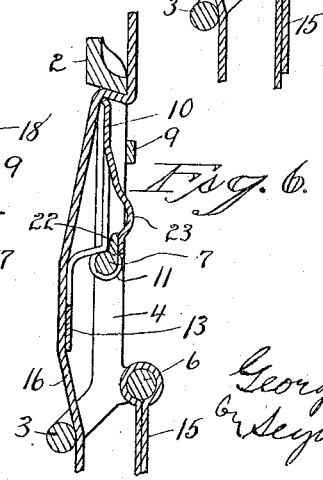

Figure 1 a top or plan view of a buckle constructed in accordance with my invention. Fig. 2 a side view of the same. Fig. 3 a sectional view on the line *a—b* of Fig. 1. Fig. 4 a sectional view on the line *c—d* of Fig. 1 showing the buckle in connection with a web. Fig. 5 a plan view of a modified form of my invention. Fig. 6 a sectional view of another modification. Fig. 7 a plan view of a buckle embodying my invention and showing a bearing for the spring lever on the side bars of the frame.

This invention relates to an improvement in buckles particularly designed for use in connection with a fabric strap where it is desirable to hold the strap by friction rather than by means of a lever with teeth which are liable to cut a webbing strap.

The object of this invention is to provide a buckle with a tension lever and with means for increasing the tension as the lever opens; and the invention consists in a buckle having certain details of construction as will be hereinafter described and particularly recited in the claims.

In carrying out my invention I employ a frame having a front bar 2, rear bar 3, side bars 4, 5. The rear bar is arranged above the plane of the sides so as to form a tuck loop, and near this rear bar is an attaching bar 6 which is slightly set inward from the frame. Substantially midway of the buckle is a pivot bar 7 formed with a rearwardly projecting lug 8, and between this pivot bar and the front bar is a transverse supporting bar 9. Pivotally mounted on the pivot bar is a lever 10 formed with ears 11 and 12 which are folded around the pivot bar so as to pivotally connect the lever therewith. The lever is also formed with a rearwardly projecting finger-piece 13 and with an integral spring tongue 14 which projects over the lug 8 the rear end of which, however, is protected by the finger piece so that it is not liable to be caught by the web passing over it. The fixed end of the web 15 is secured to the bar 6, while the free end 16 of the web passes upward between the front bar and the end of the lever over the lever and under the rear bar or tuck loop 3. The lever is so proportioned in length as to meet the inner edge of the front bar which inner edge is tapered, and any strain upon the strap tends to draw the end of the lever into close contact with the inner edge of the front bar and the outer end of the lever is forced downward by the engagement of the spring tongue 14 with the lug 8. To disengage the web it is only necessary to press downward upon the finger-piece 13 which lifts the outer end of the lever away from the front bar, such movement placing greater tension upon the spring tongue 14 so that when the finger-piece is released it will snap back into place.

In buckles for wide webs it might be desirable to provide two spring tongues. Thus as shown in Fig. 5 of the drawings the pivot bar 17 is provided with two lugs, and the lever 18 with two spring tongues 19 and 20 on opposite sides of the finger-piece 21, the spring tongues being in line with the lugs on the pivot bar. Instead of having the lug project rearward from the pivot bar, a lug 22 might project forward from the pivot bar 7 and the spring 23 instead of bearing upon the upper surface of the lug might be bent to bear upon the under face, as shown in Fig. 6. It will also be apparent, and as shown in Fig. 7 of the drawings, that instead of forming the lug on the pivot bar, lugs 24 may be formed on one or both of the side bars 4 and 5 in line with the spring tongues 25 on the lever and obtain the same result as above specified, it only being essential that the frame be provided with a lug in the path of a spring tongue formed integral with the lever.

I claim:—

1. A buckle comprising a frame including a pivot bar, a lever mounted on said pivot bar, said lever formed with an integral spring-tongue, and a lug in the path of said tongue and on which the spring-tongue bears.

2. A buckle comprising a frame including a pivot bar, said pivot bar formed with a lug, a lever mounted on said pivot bar and formed with an integral spring tongue adapted to bear upon said lug.

3. A buckle comprising a frame having a front bar, a rear bar, an attaching bar forward of the rear bar, a pivot bar between the ends of the buckle, said pivot bar formed with a lug and a lever pivotally mounted on said pivot bar, said lever adapted to co-act with the front bar of the buckle said lever formed with a rearwardly projecting finger-piece and with a spring tongue formed integral with the lever and projecting into contact with the said lug.

GEORGE R. NETTLETON.

Copies of this patent may be obtained for five cents each, by addressing the "Commissioner of Patents, Washington, D. C."